F. D. WILLIAMS.
METHOD OF TAKING MOTION PICTURES.
APPLICATION FILED MAY 22, 1916.

1,273,435.                                       Patented July 23, 1918.

Inventor.
Frank D. Williams.
by Edmund A. Strause
Atty.

UNITED STATES PATENT OFFICE.

FRANK D. WILLIAMS, OF LOS ANGELES, CALIFORNIA.

METHOD OF TAKING MOTION-PICTURES.

1,273,435.  Specification of Letters Patent.  Patented July 23, 1918.

Application filed May 22, 1916.  Serial No. 99,011.

*To all whom it may concern:*

Be it known that I, FRANK D. WILLIAMS, a citizen of the United States, residing at Los Angeles, in the county of Los Angeles and State of California, have invented new and useful Improvements in Methods of Taking Motion-Pictures, of which the following is a specification.

This invention relates to a method of taking motion pictures, and is especially adapted to produce a picture showing two or more objects in relative positions in which they have not actually been placed.

In the production of motion pictures it is often desirable to have an actor play a double role and in each of which roles he appears at one and the same time in the picture. Heretofore this has been accomplished by double exposure in which one-half of the film is masked and a picture taken upon the unmasked portion. The picture taken upon the unmasked portion of the film shows the actor playing one role. The exposed portion of the film is then masked and the unexposed portion unmasked whereupon a second set of pictures are taken of the actor in his second role. The film is then developed showing the actor in his two roles at one and the same time. Such a method can only be used to produce pictures in which there is a line of division, not visible in the finished picture, between the actor in his two roles. The pictures of the actor cannot overlap at any time.

It is an object of my invention to take a picture showing an object overlapped, that is, in the case of an actor playing a double role he may be shown in the position behind himself or in any overlapped position.

It is a further object of my invention to place an object such as an actor upon a background before which he has not actually been disposed. Thus a person may be shown in a room in which he has not actually been or upon an object upon which he is not actually positioned. By my invention, scenes such as the chaining of a woman to a track and her liberation therefrom at just the moment that the train running at high speed is about to bear down upon her, may be produced without actually placing the actors in such a dangerous position. There are many other trick pictures which can be produced by superimposing various objects upon different backgrounds, thereby producing effects which cannot be actually enacted or which would be dangerous for the actors.

I accomplish these objects by means of my invention, an application of which is hereafter described with the aid of the accompanying drawing. In the drawing, Figure 1 is one picture severed from a film or motion picture negative.

Figure 1:
Figure 3:
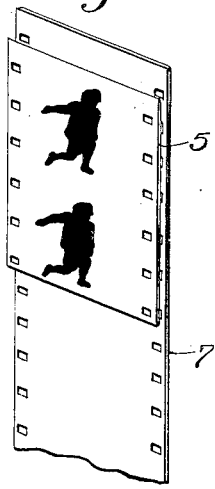
Fig. 3 shows the superimposed positions of an unexposed sensitive film and the negative shown in Fig. 1.
Figure 2:
Fig. 2 is a positive of the picture shown in Fig. 1.
Figure 4:
Fig. 4 is the completed negative of a picture.

Referring more particularly to the drawings they show the application of my invention to the taking of a picture showing a boy racing with himself with the two figures running " neck and neck." To produce this effect a picture is taken of the boy before a black background, and the negative developed. This produces a negative 5 in which the boy is the only object shown thereon, the rest of the film being transparent. From this negative 6 a positive is made as shown in Fig. 2. In the positive the figure of the boy is transparent while the background is black. The negative 5 is then intensified to produce as far as possible a black silhouette thereon. It is then superimposed upon an unexposed film 7 and a picture taken of the boy in his second role, and before a background suitable for the purpose. The black silhouette of the boy of the negative will mask the film 7 and produce in silhouette thereon an unexposed portion of the sensitive surface. The negative 5 is then removed from the film 7 and the positive 6 substituted therefor in exact registration with the silhouette of the unexposed surface, whereupon an exposure is made. All of the background with the exception of the picture of the boy as taken the second time will be masked by the black portion of the positive and the picture of the boy will be projected on the unexposed silhouette of the film 7. This completes the exposure of the film 7 and it is now developed producing a negative 8 showing the boy racing with himself and in which the figures are overlapped.

In the same manner a picture may be produced of a person standing within the lobby of a hotel. A picture is taken upon a film of the person disposed before a black background. This is best done in a tunnel lined with black velvet. The negative is developed therefrom, a positive from the negative, and the negative then intensified. The negative is superimposed upon a film and a picture taken of the hotel lobby or a set to represent the same. The positive is then substituted for the negative of the person and another exposure made, producing a picture which when developed is a negative showing the person within the lobby of the hotel.

Instead of using as a background the actual hotel or set representing the same, a photograph thereof may be used. By means of the latter scheme it is possible to take pictures of persons in remote places, such as on the streets of a foreign city.

Where it is desired to take a picture such a person on a track before a locomotive, the scene is enacted by the persons before a black background. A negative and positive of the actors is made and the negative intensified. This intensified negative is then placed in front of an unexposed negative and a picture is then taken of the background showing the locomotive approaching. The positive of the actors is then substituted for the negative, and an exposure to light made. By proper registration of the actors and locomotive the person may be shown removed from the track when the locomotive is within a few feet.

Various other possible effects may be produced by means of my invention, and which are within the skill of the camera man. The effects are so numerous that only a few have been herein described. These, however, illustrate practical embodiments of my invention.

The primary feature of my invention is to mask a sensitive film with a silhouette showing the object to be produced thereon, projecting a background on the unmasked portion thereby producing a silhouette of the object in the unexposed film. Next the exposed portion of the surface is masked and a picture of the object projected in the silhouette. A film is thereby produced which when developed shows the object disposed in the background.

Throughout the claims the word "plate" has been used to broadly designate any light sensitive body, such as films or glass plates. The word "silhouette" is used to designate a surface having a position bounded by lines, said surface within the lines of different nature than the surface without, thus the word silhouette is used to define a portion of the sensitive surface of a plate which has been unaffected by light, while the remaining surface has been affected by light.

What I claim is:

1. The herein described photographic method of producing pictures, which consists in masking a sensitive plate with a silhouette showing the object to be produced thereon, projecting a background on the unmasked portion, masking the exposed portion of the plate and projecting a picture of the object in the unmasked portion.

2. The herein described photographic method of producing pictures, which consists in making a negative of an object printing a positive from said negative, disposing said negative before a sensitive plate to mask a silhouette thereon, projecting thereon a second object, substituting said positive for said negative and exposing to light.

3. The herein described photographic method of producing pictures, which consists in making a negative of an object, printing a positive from said negative, superimposing said negative upon a sensitive plate, projecting another object on said superimposed negative and plate, substituting said positive for said negative in its superimposed position and exposing to light.

4. The herein described photographic method of producing pictures, which consists in making a negative of an object, printing a positive from said negative, superimposing said negative upon a sensitive plate, projecting a second object on said superimposed negative and plate, thereby producing on said plate a silhouette of the object unaffected by the light, substituting said positive for said negative in its superimposed relation with the picture of the object thereon in registration with said silhouette, and exposing to light.

5. The herein described photographic method of producing pictures, which consists in making a negative of the subject before a black background and then developing the same, then making a positive plate from said negative and developing the same, then intensifying the negative to produce a substantially black silhouette of the photographed subject, then superimposing the negative upon an unexposed plate or film and photographing the subject in a position overlapping the subject as first photographed before a suitable background, then removing said negative from said film or plate and substituting therefor the positive plate in exact registration with the silhouette made on the unexposed film or plate and exposing the same, whereby the finally developed film or plate will show the subject or object overlapping itself and in different positions.

In witness that I claim the foregoing I have hereunto subscribed my name this 13th day of May, 1916.

FRANK D. WILLIAMS.